United States Patent [19]

Meyn

[11] 4,117,570
[45] Oct. 3, 1978

[54] APPARATUS FOR CUTTING OUT THE VENT OF A FOWL

[76] Inventor: Pieter Meyn, Noordeinde 68, Oostzaan, Netherlands

[21] Appl. No.: 818,767

[22] Filed: Jul. 25, 1977

[51] Int. Cl.$^2$ .................... A22B 3/08; A22C 21/00
[52] U.S. Cl. .................................................. 17/11
[58] Field of Search ........................................... 17/11

[56] References Cited

U.S. PATENT DOCUMENTS

| 2,590,785 | 3/1952 | Nealy | 17/11 R |
| 3,958,303 | 5/1976 | Scheier et al. | 17/11 X |

Primary Examiner—Travis S. McGehee
Attorney, Agent, or Firm—Jones, Thomas & Askew

[57] ABSTRACT

Aparatus for cutting out the vent of a fowl, having at least one cutting means with a hollow cylindrical knife rotating about a center pin, which is axially reciprocable and rotatable relative to the knife, and a helical hook concentrically mounted within the knife and rigidly coupled with the pin; the relative movement of the center pin and the knife being controlled in such manner, that the center pin is first inserted into the vent opening of the fowl and than rotated over a limited angle, so that the hook grips the vent in a corkscrew-like manner, after which the hook holding the vent and the knife are moved towards each other, so that the vent is cut out, and finally the knife and the pin are withdrawn and the cut out vent is released by rotating the hook in the opposite direction while restraining the vent.

9 Claims, 5 Drawing Figures

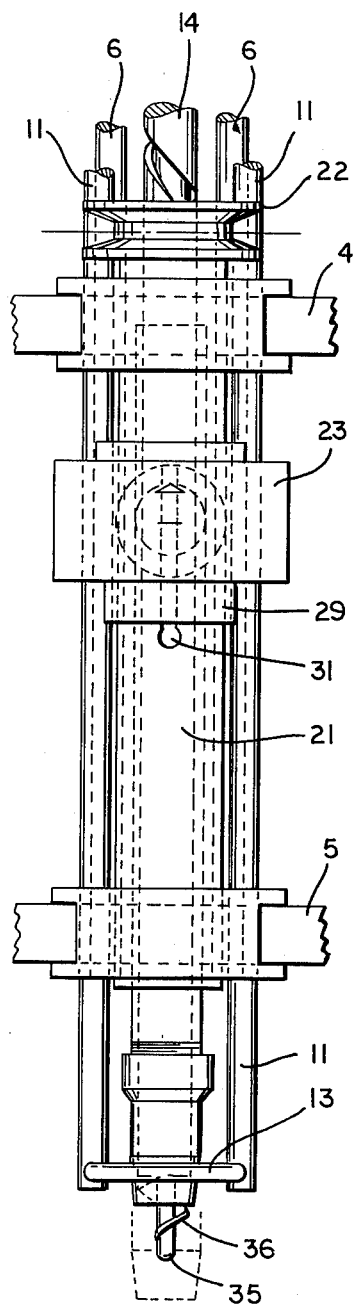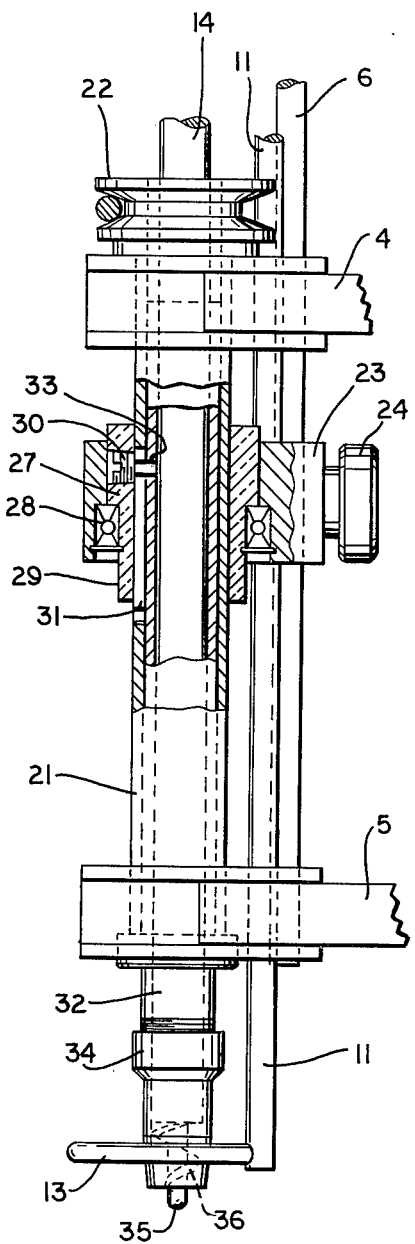

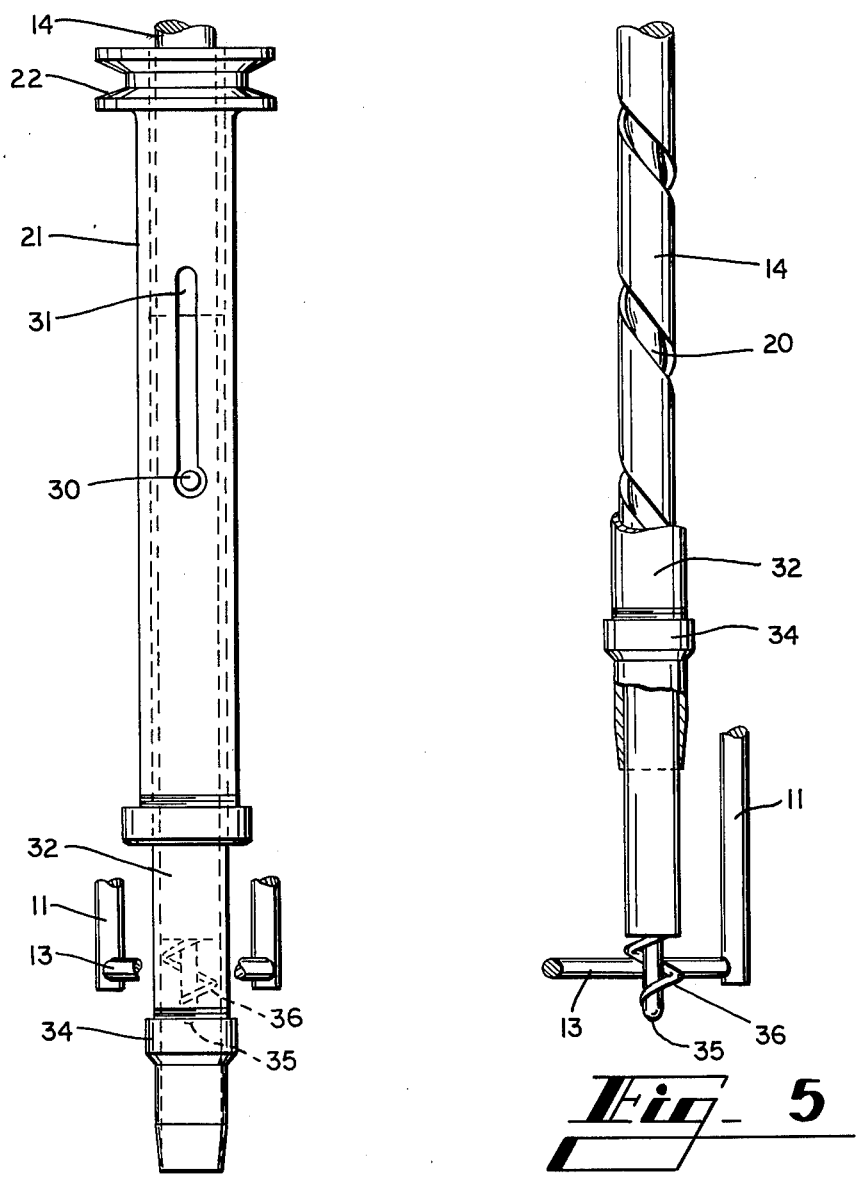

APPARATUS FOR CUTTING OUT THE VENT OF A FOWL

BACKGROUND OF THE INVENTION

The invention relates to an apparatus for cutting out the vent of a fowl, which is hanging by the ankle joints from a shackle of an overhead conveyor, comprising at least one cutting means moving along with the conveyor and having a hollow cylindrical knife concentrically rotating about a centre pin, which for cutting the vent is inserted into the vent opening in order to centre the knife relative to the fowl's vent.

The known apparatuses of this kind, which serve to make a circular cut in the skin of the fowl around its vent, in such a manner that the skin is severed from the entrails of the fowl, without damaging the entrails, have the disadvantage that the cut vent is often caught by the rotating knife, so that the fowl's rectum is twisted and might rupture, in which case the entrails are damaged.

BRIEF SUMMARY OF THE INVENTION

It is the object of the invention to overcome the disadvantage hereinbefore described.

According to the invention this object is attained by an apparatus of the kind refered to, in which the centre pin and the knife are axially movable relative to each other, the centre pin being contained with some play within a helical concentric hook rigidly connected to the pin and fitting within the rotating knife, and in which the pin while being inserted into the vent opening is rotated together with the hook over a limited angle about its axis, so that the hook grips the vent in the manner of a cork screw, after which the vent is pulled up towards the knife by the hook and is cut out by the knife, and finally the hook is rotated in the opposite direction and disconnected from the cut out vent.

Preferably the centre pin is rigidly coupled with an abutment member, which at the insertion of the centre pin into the vent opening grips between the fowl's legs and so stops the movement of the pin towards the fowl, so that irrespective of the fowl's size the insertion depth of the pin into the vent opening is always the same. It is also prefered if while the vent is pulled up by the hook, the rotating knife is moved down over the hook for cutting out the vent and is pulled back again before the hook is rotated in the opposite direction.

Advantageously the hook is rotated relative to the vent in the opposite direction over an angle which is larger than, but at least equals the angle over which the hook was rotated during the insertion of the centre pin. It may also be of advantage if the cut out vent is restrained by a stationary flexible member which frictionally holds the vent when the hook is rotated in the opposite direction.

In a very efficient embodiment the centre pin and the hook are attached to the lower end of a shaft rotatably mounted in a block which is slidable towards and away from the fowl along a slide means moving along with the conveyor, the shaft having a helical groove into which a follower pin of a second block slidably mounted on the guide means protrudes, so that the centre pin and the hook are rotated when the two blocks are moved relative to each other. Preferably the rotating knife is connected with a third slide block for moving the knife towards and away from the fowl. Finally it is prefered if the movements of the slide blocks are controlled by stationary cam tracks cooperating with followers attached to the blocks.

BRIEF DESCRIPTION OF THE DRAWINGS

Further features and advantages of the invention will become apparent from the following description of an embodiment of the invention, taken in connection with the accompanying drawings, in which:

FIG. 2 is a front view of the lower part of a cutting means of the apparatus shown in FIG. 1;

FIG. 3 is a partially sectional side view of the cutting means shown in FIG. 2;

FIG. 4 is a front view of the knife of the cutting means shown in FIG. 2; and

FIG. 5 is a side view of the centre pin of the cutting means shown in FIG. 2.

DETAILED DESCRIPTION OF THE PREFERRED EMBODIMENT

Figure 1:
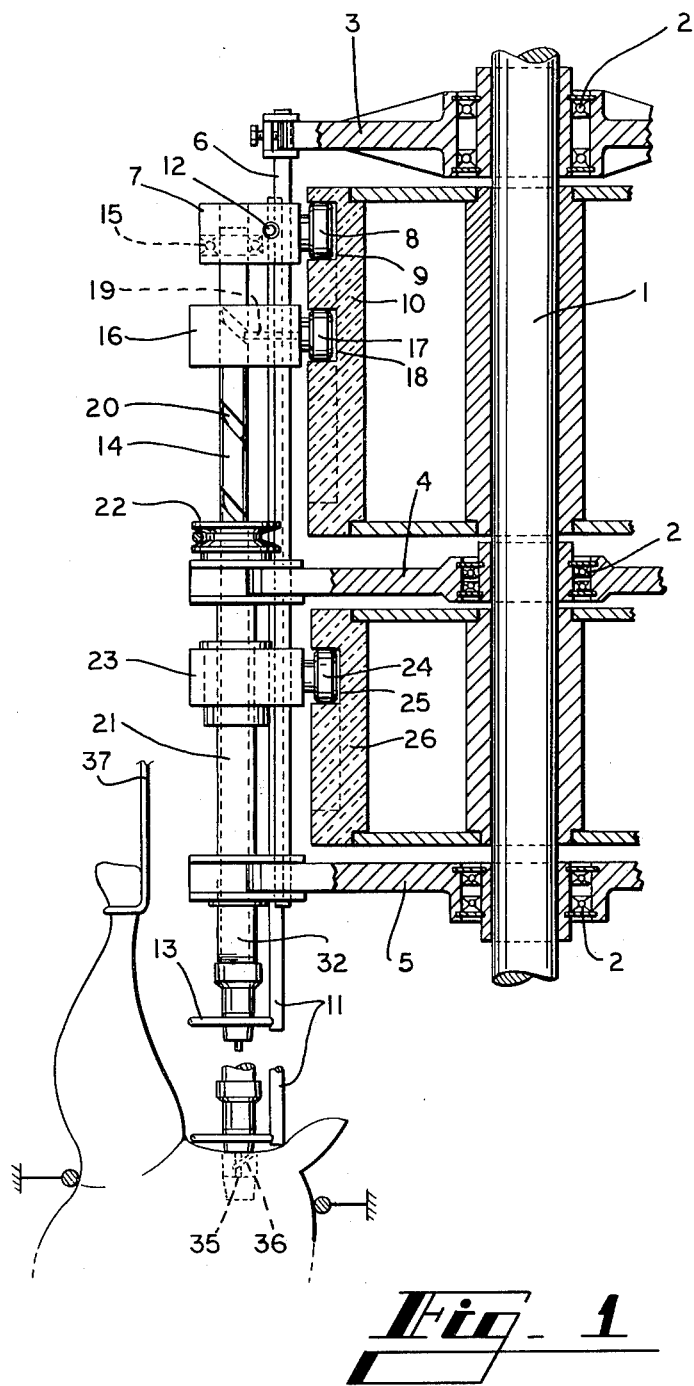
FIG. 1 is a sectional view of part of an apparatus according to the invention.

The apparatus shown in the drawings is built in the manner of a merry-go-round and comprises a vertical central shaft 1, on which by means of bearings 2 three horizontal supports 3, 4, and 5 are rotatably mounted at a distance above each other. The supports are interconnected by a plurality of pairs of vertical guide bars 6 regularly spaced about the circumference of the supports. On the upper part of each pair of guide bars 6 a first slide block 7 is slideably mounted. The block 7 carries a follower 8 facing the central shaft 1 and cooperating with a stationary cam track 9 in a cylinder 10 rigidly connected with the central shaft 1. The slide block 7 supports two bars 11 in parallel with the shaft 1, which by means of clamping screws 12 are fastened in corresponding bores of the block 7 with their upper ends, whereas the lower ends of the bars 11 are interconnected by means of a loop shaped abutment member 13, generally extending horizontally away from the shaft 1.

At a radial distance in front of the bars 11, the upper end of a shaft 14 is rotatably but axially immovaly mounted in the slide block 7 by means of a bearing 15. Below the slide block 7 a second slide block 16 is slideably mounted on each pair of guide bars 6 above the middle support 4. The second slide block 16 has openings through which the bars 11 and the shaft 14 pass. The slide block 16 further carries a follower 17 facing the central shaft 1 and cooperating with a cam track 18 in the cylinder 10. Within the opening for the shaft 14 the slide block 16 is provided with a follower pin 19, the outer end of which protrudes into an external groove 20 in the surface of the shaft 14.

The lower part of the shaft 14 is received with ample play in a concentric driving sleeve 21, which is rotatably mounted in the horizontal supports 4 and 5 at a radial distance in front of the guide bars 6 and the bars 11. The upper end of the driving sleeve 21 carries a pulley 22 for a V-belt, which directly overlies the horizontal support 4.

Between the horizontal supports 4 and 5 a third slide block 23 is slideably mounted on each pair of guide bars 6. Like the supports 4 and 5 the slide block 23 is provided with openings through which the bars 11 freely pass. The block 23 further carries a follower 24 facing the central shaft 1 and cooperating with a stationary cam track 25 in a second cylinder 26 rigidly connected with the central shaft 1. Coaxially with the shaft 14 and the driving sleeve 21 the block 23 is provided with a bore 27, wherein a bushing 29 is rotatably but axially immovable coupled with the driving sleeve 21 by means of a follower pin 30 threaded into the bushing and protruding into a vertical slot 31 of the driving sleeve 21. Within the driving sleeve 21 the shaft 14 carries a freely movable support sleeve 32 with a hole 33 which receives the follower pin 30, so that the support sleeve is rigidly coupled with the bushing 29. The lower end of the support sleeve 32 carries a cylindrical knife 34.

The lower end of the shaft 14 carries a centre pin 35 concentric with the shaft, and a helical hook 36 concentric with the pin 35. The pin and the hook extend below the abutment member 13, which also sufficiently leaves the kinfe 34 free.

The apparatus operates in the following manner:

When a bird hanging by the ankle joints from a shackle 37 of an overhead conveyor (not shown in the drawings) is carried to the apparatus by the conveyor, the bird's vent will come to lie straight below one of the cutting means of the apparatus. Because a driving wheel (not shown) which is rotatably mounted on the central shaft 1 and is coupled with the upper horizontal support 3, is turned by the conveyor, the cutting means will move along with the bird. As the horizontal supports revolve about the central shaft 1 the slide blocks 7, 16, and 23 will move along the guide bars 6 in accordance with the shape of the corresponding cam tracks, in such a manner that first the blocks 7 and 16 slide down together until the abutment member 13 grips between the bird's legs and the centre pin 35 is inserted into its vent opening. Since the upper block 7 has a free fall stroke, the distance over which the abutment member and the centre pin will move down will exclusively be determined by the size of the bird and in particular by the length of its legs. Because the shaft 14, which carries the centre pin 35 cannot move axially relative to the abutment member 13, the centre pin will always penetrate over the same depth into the bird irrespective of the size thereof. In this way the apparatus will adapt itself automatically to the size of the bird.

As soon as the upper slide block 7 is stopped because the abutment member 13 grips between the bird's legs, further downward movement of the second slide block 16 will cause the shaft 14 to rotate since the follower pin 19 is moved along the helical groove 20 of the shaft 14. The angle over which the shaft is rotated is determined by the height of the second slide block 16 over its lowest position at the moment the upper slide block 7 is stopped. Because of the rotation of the shaft 14 the helical hook 36 will be screwed like a cork screw into the meat of the bird's vent, which is held against rotation by the skin of the bird.

The hook is then slightly pulled towards the rotating knife 34, which is still in its upper position and is driven by a V-belt through the pulley 22, in order to separate the vent and the surrounding skin from the underlying entrails of the bird. The slide block 23 is then moved down and takes along the rotating knife by the pin 30 which slides in the slot 31 of the driving sleeve 21, so that the vent is cut out of the skin of the bird by the knife 34. Hereafter the slide block 23 is moved up again, so that the knife 34 is also pulled back.

After the knife 34 has been pulled back the slide block 7 is returned to its upper position, thereby positioning rotating the shaft 14 over a further small angle, in which case the cut out vent will rotate with the hook. Finally the second slide block 16 is also returned to its upper position, thereby rotating the hook in the opposite direction over the full angle determined by the distance between the slide blocks 7 and 16. In the meantime the cutting means has reached a stationary resilient member which frictionally grips and restrains the vent held by the hook, so that the hook is screwed out of the vent when the hook is rotated in the opposite direction. As soon as the vent is freed from the hook it drops down and because the bird is already being carried away from the apparatus by the conveyor, the vent will come to hand over the bird's back at the end of the rectum. The cutting means with all slide blocks returned to the starting positions is then ready for a next bird.

I claim:

1. In an installation for processing slaughtered poultry, including an overhead conveyor supporting a plurality of shackles, each adapted to carry a fowl by its ankle joints:

appartus for cutting out the vent of a fowl depending from one of said shackles, comprising:
a frame;
at least one cutting means carried by said frame; and
means connected with said frame for moving said cutting means along with said conveyor and relative thereto towards and away from said fowl;

said cutting means comprising
a hollow cylindrical knife mounted for rotation about a center pin, adapted to be inserted into the fowl's vent opening as said cutting means is moved towards said fowl, for bringing said rotating knife into the right position for cutting out the fowl's vent;
driving means for rotating said knife; and
means for axially moving said rotating knife and said center pin relative to each other;

said cutting means further comprising:
a helical hook within said knife, concentrically surrounding said center pin with some play and rigidly connected therewith; and p2 means for rotating said center pin and said hook about a common axis;

and means for controlling the relative movements of said knife and said center pin in such manner, that said pin while being inserted into the vent opening is rotated together with said hook over a limited angle about said common axis, so that said hook grips the fowl's vent in the manner of a corkscrew, after which the vent is pulled up towards said knife by said hook and is cut out by said knife, and finally said hook is rotated in the opposite direction and freed from the cut out vent.

2. Apparatus according to claim 1, wherein said cutting means further comprises an abutment member, which is coupled with said center pin and adapted to grip between the fowl's legs when said center pin is inserted into the fowl's vent opening, thereby stopping the movement of said center pin towards the fowl, so that irrespective of the fowl's size the insertion depth of said center pin into the vent opening is always the same.

3. Apparatus according to claim 1, wherein the movements of said center pin and said rotating knife are controlled by said control means in such manner, that when the vent is pulled upwards by said hook, said rotating knife is moved down over said hook for cutting out the vent, and is pulled back again before said hook is rotated in said opposite direction.

4. Apparatus according to claim 1, wherein the movements of said center pin are controlled by said control means in such manner, that said hook is rotated relative to the vent in said opposite direction over an angle, which is larger than, but at least equals the angle over which said hook was rotated during the insertion of said center pin.

5. Apparatus according to claim 1, wherein a stationary resilient member is attached to said frame, said member being adapted to frictionally grip the cut out vent when said hook is rotated in said opposite direction, thereby preventing the vent from rotating with said hook.

6. Apparatus according to claim 1, further comprising:
- a vertical central shaft attached to said frame;
- a plurality of laterally extending supports, mounted for rotation on said central shaft; and
- a vertical guide means carried by said supports, for each of said cutting means;

said means for axially moving and rotating said center pin and said helical hook comprising:
- a first slide block slidably mounted on said guide means;
- a shaft rotatably supported in said first slide block and having an external helical groove;
- a second slide block slidably mounted on said guide means;
- and a follower pin attached to said second slide block and protruding into said helical groove, so that said center pin and said hook, being attached to the lower end of said shaft, will be rotated when said slide blocks are moved relative to each other.

7. Apparatus according to claim 6, wherein each of said slide blocks carries a follower roller cooperating with a stationary cam track attached to said frame, so that said slide blocks are moved along said guid means as said supports are rotated about said central shaft.

8. Apparatus according to claim 6, wherein said means for axially moving said rotating knife comprises a third slide block slidably mounted on said guide means and coupled with said knife.

9. Apparatus according to claim 8, wherein each of said slide blocks carries a follower roller cooperating with a stationary cam track attached to said frame, so that said slide blocks are moved along said guide means as said supports are rotated about said central shaft.

* * * * *